UNITED STATES PATENT OFFICE.

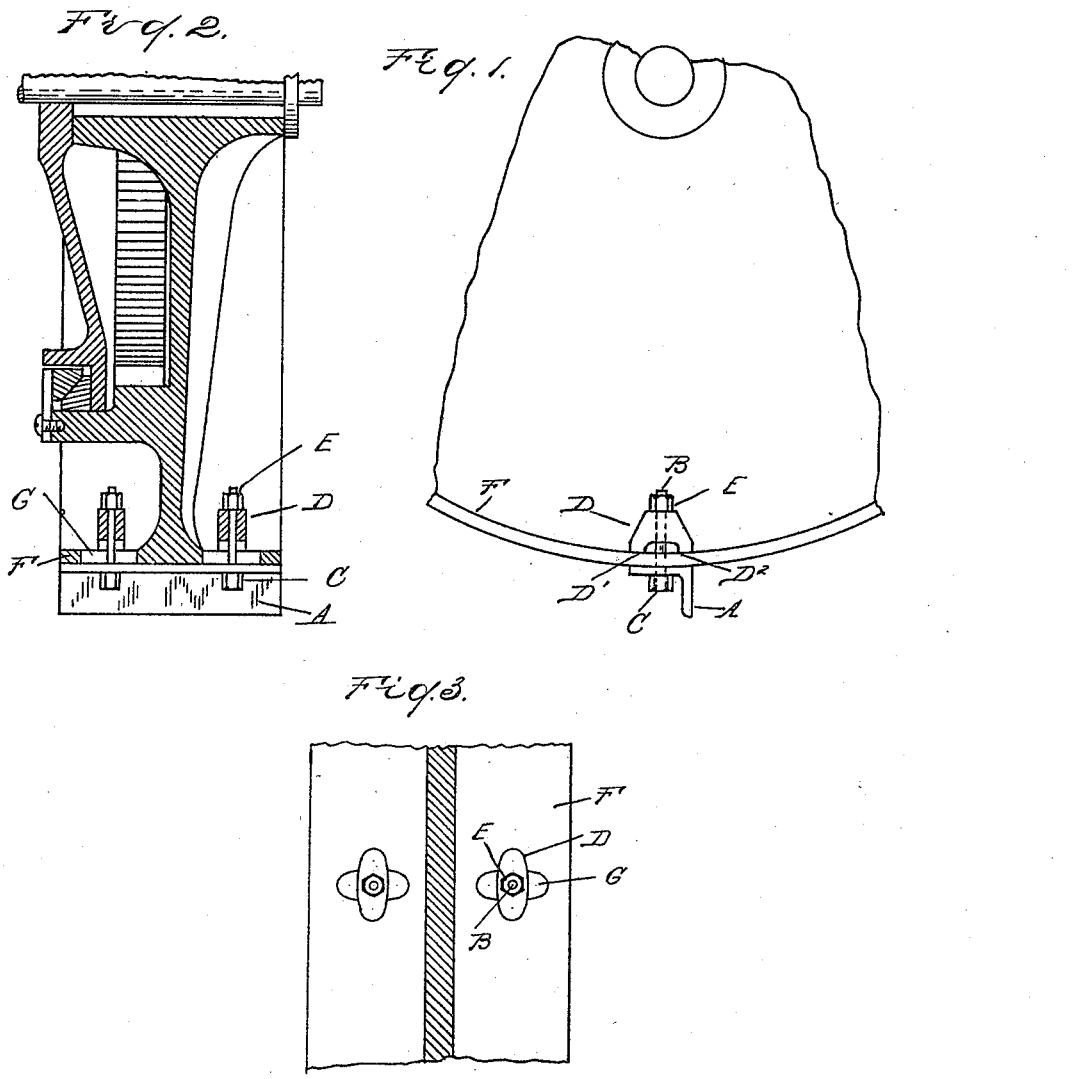

ERNEST GOLDBERGER, OF DETROIT, MICHIGAN.

DETACHABLE LUG FOR TRACTORS.

1,402,856.  Specification of Letters Patent.  Patented Jan. 10, 1922.

Application filed January 30, 1920. Serial No. 355,207.

*To all whom it may concern:*

Be it known that I, ERNEST GOLDBERGER, a citizen of the United States of America, residing at Detroit, in the county of Wayne and State of Michigan, have invented certain new and useful Improvements in Detachable Lugs for Tractors, of which the following is a specification, reference being had therein to the accompanying drawings.

The invention relates to tractor wheels provided with lugs detachably secured to the periphery thereof, and it is the object of the invention to obtain a construction in which the lug and the attachment means therefor form a unit. To this end the invention consists in the construction as hereinafter set forth.

In the drawings:

Figure 1 is a side elevation of the wheel, showing one of the lugs in engagement therewith;

Figure 2 is a cross section of the wheel and applied lugs taken on a radial plane extending through the lugs; and Figure 3 is a view partially in section and partially in plan of the lugs and the inner adjacent portion of the wheel.

In the present state of the art tractor wheels have been provided with detachable lugs, but these are usually attached by means of bolts or equivalent securing means, which must be completely disengaged before the lugs can be removed. Frequently, the threads of the bolts or nuts have become burred or corroded, so that detachment is difficult. Also, after detachment the separate parts are frequently lost, which makes trouble when the lugs are again required for use.

With my improved construction the lugs have permanently secured thereto attachment devices so constructed that they may be used for securely clamping the lugs to the periphery of the wheel and which also provide for the removal of the lugs from the wheel without detachment of any of the parts.

In detail, A is a lug which, as shown, is formed on an angle bar extending transversely of the periphery of the wheel. B are bolts passing through the base flange of the lug A and having heads C, preferably so arranged as to prevent the turning of the bolts. D are clamping members sleeved upon the inner ends of the bolts B and preferably of oblong shape, having bearing portions D' and D² for engagement with the inner face of the peripheral flange of the wheel. E are nuts engaging the threaded ends of the bolts and bearing against the clamping members D. To permit of engagement with the wheel, the peripheral flange F thereof is provided with transversely elongated apertures G, so fashioned as to permit the insertion therethrough of the nuts E and clamping members D. When, however, the clamping members are given a quarter turn, the bearing portions D' and D² will engage with the inner face of the rim and by then tightening the nut the lug will be securely clamped to the outer face. The construction is therefore one which may be very quickly attached or detached and as it is only necessary to turn the nut a slight distance to relieve the clamping pressure, the device will always remain in operative condition.

What I claim as my invention is:

1. The combination with a wheel having an apertured peripheral rim, of a lug and a member rotatably mounted on said lug adapted to be inserted bodily through the aperture in said rim, said member having a wedging engagement with the rim proper upon rotation after insertion and means movable radially for tightening said member.

2. The combination with a wheel having a peripheral rim, of a lug for attachment thereto, securing means comprising a bolt permanently secured to the lug, and a clamping member sleeved on said bolt insertable therewith through an aperture in said rim and adjustable for engagement with said rim, the securing means and lug being removable as a unit structure from the rim when the clamping member is in disengaged position.

3. The combination with a wheel having a peripheral rim provided with a transversely elongated aperture therethrough, of a lug for engaging the outer face of said rim, and a clamp permanently attached to said lug having an elongated portion insertable through said aperture and engageable with the inner face of the rim when revolved through a part of a revolution, and means for tightening said clamp.

4. The combination with a wheel having an apertured peripheral rim, of a lug for attachment to said rim and means carried by said lug insertable through an aperture in said rim and rotatably adapted for wedge engagement with the rim.

5. The combination with a wheel having an apertured peripheral rim, of a lug and a member carried by said lug adapted to be inserted bodily through the aperture in said rim, said member being rotatably adjustable out of registration with said aperture and into clamping engagement with said rim.

In testimony whereof I affix my signature.

ERNEST GOLDBERGER.